US006305063B1

(12) United States Patent
Ashcraft et al.

(10) Patent No.: US 6,305,063 B1
(45) Date of Patent: Oct. 23, 2001

(54) METHOD OF MANUFACTURING A GOLF CLUB HEAD

(75) Inventors: Danny C. Ashcraft, Vista; Richard E. Parente, San Diego; Richard De La Cruz, Pauma Valley, all of CA (US)

(73) Assignee: Danny Ashcraft, Vista, CA (US)

(*) Notice: Subject to any disclaimer, the term of this patent is extended or adjusted under 35 U.S.C. 154(b) by 0 days.

(21) Appl. No.: 08/687,909

(22) Filed: Jul. 30, 1996

Related U.S. Application Data

(60) Continuation of application No. 08/398,175, filed on Mar. 2, 1995, now abandoned, which is a division of application No. 08/159,738, filed on Nov. 30, 1993, now Pat. No. 5,527,034.

(51) Int. Cl.[7] ...................... B23P 17/00
(52) U.S. Cl. ...................... 29/418; 29/445; 29/558; 473/345; 473/305
(58) Field of Search ...................... 29/557, 558, DIG. 18, 29/445, 418; 273/167 R, 167 A, 167 F, 167 G, 167 H, 167 K, 269, 172, 173, 174, 175, 80.4; 473/345, 350, 305

(56) References Cited

U.S. PATENT DOCUMENTS

| | | | | |
|---|---|---|---|---|
| 1,167,106 | | 1/1916 | Palmer . | |
| 1,235,922 | | 8/1917 | Pittar . | |
| 1,269,745 | | 6/1918 | Robertson . | |
| 1,299,014 | * | 4/1919 | O'Hara | 273/169 |
| 1,526,438 | * | 2/1925 | Scott . | |
| 1,541,126 | | 6/1925 | Dunn | 273/167 A |
| 1,568,888 | | 1/1926 | Dunn . | |
| 1,582,836 | | 4/1926 | Link . | |
| 1,601,770 | | 10/1926 | Reach et al. . | |
| 1,615,232 | | 1/1927 | Pryde et al. | 273/80.4 |
| 1,616,920 | * | 2/1927 | Pedersen | 273/174 |
| 1,968,092 | | 7/1934 | Oldham . | |
| 2,064,943 | | 12/1936 | Reach | 273/80.4 |
| 2,067,556 | | 1/1937 | Wettlaufer | 273/80 |
| 2,171,383 | | 8/1939 | Wettlaufer | 273/77 |
| 2,447,967 | | 8/1948 | Stone | 273/77 |
| 2,494,935 | | 1/1950 | Dunn | 29/DIG. 18 X |
| 2,705,147 | | 3/1955 | Winter | 273/79 |
| 3,166,320 | | 1/1965 | Onions | 273/167 A |
| 3,191,936 | | 6/1965 | Guier | 273/80.2 |
| 3,212,783 | | 10/1965 | Bradley et al. | 273/171 |
| 3,819,181 | | 6/1974 | Mills | 273/80.2 |
| 3,847,399 | * | 11/1974 | Raymont | 473/350 |
| 3,941,390 | * | 3/1976 | Husseg | 273/169 |
| 3,967,826 | | 7/1976 | Judice | 273/167 |
| 3,975,017 | | 8/1976 | Galich | 273/73 H |
| 3,976,299 | | 8/1976 | Lawrence et al. | 273/171 |
| 3,995,865 | | 12/1976 | Cochran et al. | 273/167 |
| 4,021,047 | | 5/1977 | Mader | 273/167 |
| 4,063,737 | | 12/1977 | Tom et al. | 273/174 |
| 4,214,754 | | 7/1980 | Zebelean | 273/167 |
| 4,429,879 | * | 2/1984 | Schmidt | 273/167 H |
| 4,438,931 | * | 3/1984 | Motomiya | 273/167 H |

(List continued on next page.)

FOREIGN PATENT DOCUMENTS

| | | |
|---|---|---|
| 211781 | 12/1957 | (AU) . |
| 371974 | 5/1932 | (GB) . |
| 398643 | 9/1933 | (GB) . |
| 679292 | 9/1952 | (GB) . |
| 1476889 | 6/1977 | (GB) . |
| 2241173 | 8/1991 | (GB) . |
| 9515198 | 6/1995 | (WO) . |

*Primary Examiner*—David P. Bryant
(74) *Attorney, Agent, or Firm*—Gray Cary Ware Freidenrich

(57) ABSTRACT

A golf club head of the metal wood type has a body formed entirely from one billet of high strength aluminum alloy with a separate sole plate of the same or different material secured in a machined recess on the lower face of the body. The body has an internal, empty cavity machined through a lower wall of the body, and the walls are thicker than in conventional cast stainless steel metalwoods. The front, striking face is machined to any selected bulge and roll, loft and face angle.

19 Claims, 3 Drawing Sheets

U.S. PATENT DOCUMENTS

| | | | | |
|---|---|---|---|---|
| 4,534,564 | * | 8/1985 | Yamada | 273/169 |
| 5,004,241 | * | 4/1991 | Antonious | 273/167 H |
| 5,042,806 | | 8/1991 | Helmstetter | 273/80.2 |
| 5,090,702 | | 2/1992 | Viste | 273/167 R |
| 5,120,062 | * | 6/1992 | Scheie et al. | 473/350 |
| 5,137,275 | | 8/1992 | Nelson . | |
| 5,184,819 | | 2/1993 | Desboilles . | |
| 5,232,224 | | 8/1993 | Zeider | 273/167 |
| 5,275,409 | | 1/1994 | Currie | 273/80.2 |
| 5,290,035 | | 3/1994 | Hannon | 273/167 G |
| 5,316,298 | * | 5/1994 | Hutin et al. | 273/78 |
| 5,335,909 | | 8/1994 | Green | 273/80.2 |
| 5,342,812 | * | 8/1994 | Niskanen et al. | 501/127 |
| 5,351,958 | | 10/1994 | Helmstetter | 273/167 H |

* cited by examiner

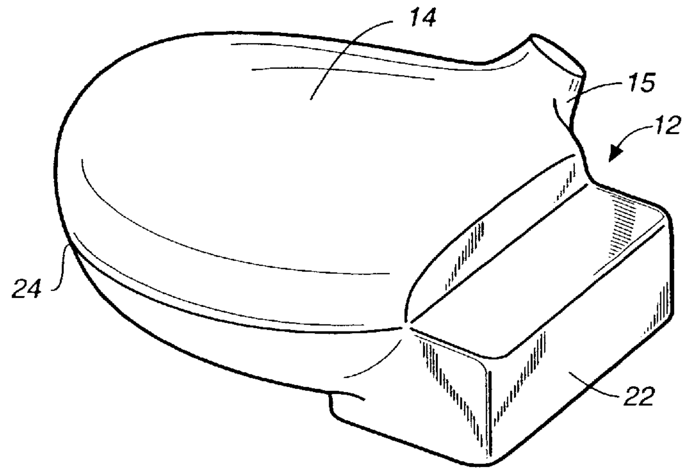
FIG._1
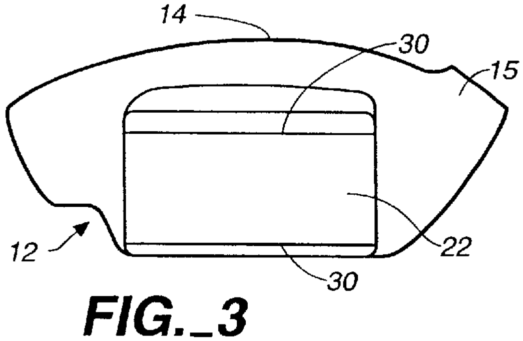
FIG._3
FIG._2
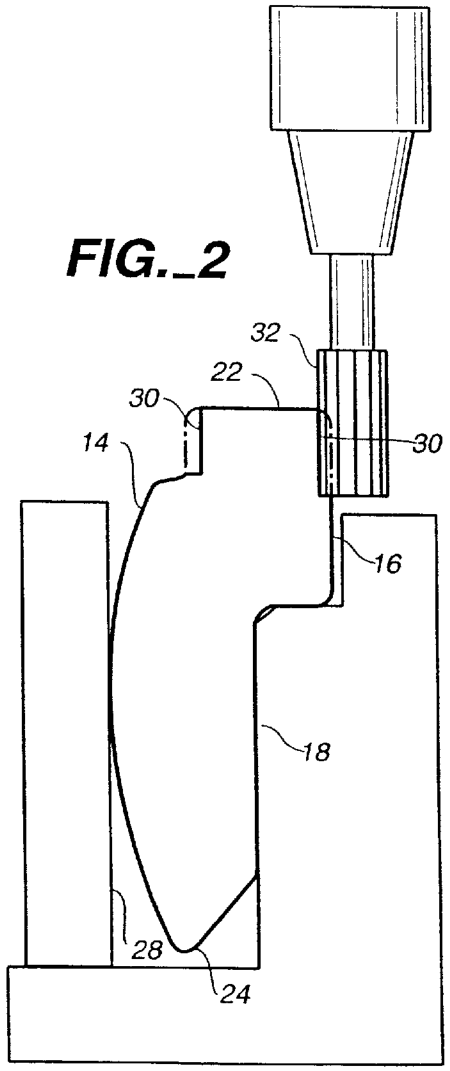

METHOD OF MANUFACTURING A GOLF CLUB HEAD

CROSS REFERENCE TO RELATED APPLICATIONS

This application is a continuation of U.S. application Ser. No. 08/398,175 which is a divisional of Ser. No. 08/159,738, filed Nov. 30, 1993 now U.S. Pat. No. 5,527,034.

BACKGROUND OF THE INVENTION

The present invention relates generally to golf clubs and their manufacture, and is particularly concerned with golf clubs of the so-called "metalwood" type.

Golf clubs are generally divided into four main types, comprising putters, irons, fairway clubs and drivers. Drivers in the past were normally made of wood, and so were often referred to as "woods". More recently, drivers have been made of metal and so are often now called metalwoods.

Most metalwoods are conventionally made of stainless steel, and with very few exceptions they are manufactured by investment casting a hollow stainless steel shell. The investment cast process can be inconsistent, and the golf club has a face which can be inconsistent and can contain sinks. It must be polished and is normally cosmetically sand blasted to hide its imperfections. When investment casting thin wall stainless steel heads, a large number of rejections result due to porosity and thin spots. The investment casting process itself is expensive, involving high tooling expenses, and the results are inconsistent.

Stainless steel is relatively heavy and thus the walls of the club head must be made relatively thin in order to maintain an acceptable club head weight. Since the skin is relatively thin, relatively high amounts of club face deflection occur when the club head strikes the ball, resulting in inconsistent performance.

SUMMARY OF THE INVENTION

It is an object of the present invention to provide a new and improved metalwood golf club head and a new and improved method of making such a golf club.

According to one aspect of the present invention, a golf club head is provided which comprises a hollow body having a front striking face, a heel, a toe, an upper wall or crown, a lower wall or sole, and a rear wall, the body being made in one piece from forged material with an internal cavity milled out through the lower wall. A separate sole plate may be secured in a machined recess in the lower face of the body, at least the body being of forged aluminum alloy or high density nonmetallic material with physical characteristics equivalent to aluminum alloy, the striking face being machined or milled to have a predetermined bulge and roll, and having a thickness of at least more than 0.125 inches thick. Preferably, the heel has a bore projecting inwardly from the upper wall into the heel and terminating within the heel, the bore comprising means for receiving a hosel and being oriented to determine the desired face angle and lie angle.

Because the club head is fabricated from a single, solid billet of forged material, it is possible to incorporate any desired face angle, lie, weight distribution or other parameters at the time of manufacture using the same basic cutting tools. The disadvantages of cast and welded club heads are thereby avoided, and the club head is significantly improved in performance. Due to the lightweight material used, and the manufacture from a single, solid billet of material, the club head can be designed to have the playing characteristics of a true wood club head, for example enhanced gear effect, which generally cannot be achieved in a large cast stainless steel head due to weight limitations. At the same time, the forged metal wood does not experience as much loss of distance as do wood heads when struck off center, and has reduced susceptibility to damage such as splitting and chipping.

Due to the lower weight of aluminum alloy as compared to stainless steel, the shell walls can be made thicker and therefore stronger than a stainless steel metalwood, while still maintaining the desired club head weight as required for men's or ladies' clubs. The alloy is preferably 6061 T6 or 7075 T6 aluminum alloy of the type which has up to now been used mainly in the aircraft industry.

Since the shell or body walls do not have to be kept to a minimum thickness to meet weight requirements, additional material may be distributed about the shell in order to adjust the club head performance properties as desired. For example, extra weight may be used at the toe and heel to produce a larger sweet spot. Extra weight may be provided at the rear wall to move the center of gravity away from the club face. This produces an enhanced "gear effect" when a ball is struck away from the center of the club face. The enhanced gear effect can be a help both to an average golfer who does not always strike the ball at the center of the club face, and to a professional who likes to be able to control the flight of the ball more accurately. The center of gravity is preferably positioned at an equivalent spot to that of a persimmon wood, about halfway between the front and rear face of the club.

According to another aspect of the present invention, a method of making a metalwood golf club head is provided, which comprises the steps of forming a solid billet of aluminum material having an upper face, a lower face, a front end, and a rear end, and milling out the lower face to form a cavity of predetermined dimensions. A sole plate receiving recess is machined on the lower face surrounding the cavity, a sole plate is secured in the recess, and the front end is machined to form a ball striking face of predetermined bulge and roll.

Preferably, the billet is forged with a projecting lug which is used to hold the billet while machining the cavity and sole plate recess. The billet and secured sole plate may be machined together to form continuous heel, toe and rear walls of the head, and the billet may then be held at a different position before machining off the lug to form a striking face of predetermined bulge and roll.

The machining steps are preferably performed in a computer controlled milling machine or CNC machine. This permits machining to very precise tolerances, resulting in improved accuracy in the finished club head. Club heads manufactured by this method will consistently meet design specifications, and the specifications can be easily varied to conform to different design parameters. The club head is machined both externally and internally by the computerized milling machine process, resulting in a high precision product with essentially no distortions.

The club head which is fabricated from a forged billet of high strength aluminum alloy will be strong, consistent in performance, and will have far superior strength, performance and rigidity as compared with a conventional stainless steel metalwood.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a perspective view of the initial forging of the club head;

FIG. 2 illustrates the cutting of tooling faces on the boss of the forging;

FIG. 3 is a front view of the prepared forging;

DESCRIPTION OF THE PREFERRED EMBODIMENT

Figure 10:
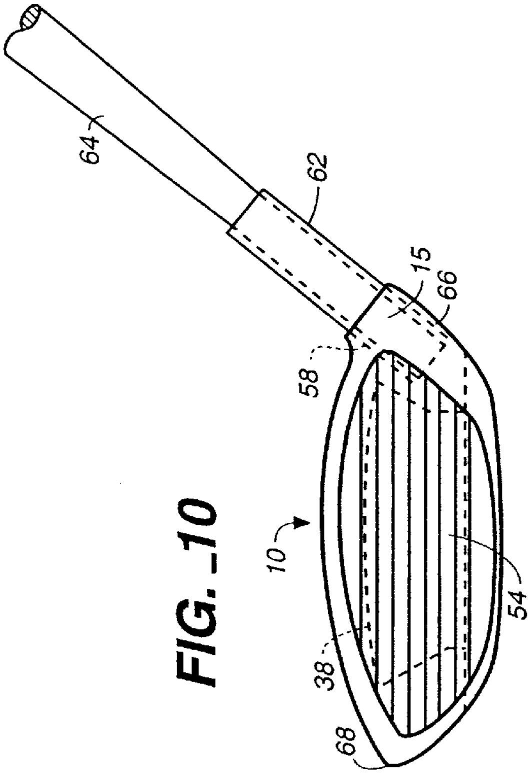
FIG. 10 is a perspective view, partially cut away, of the finished club head.
Figure 11:
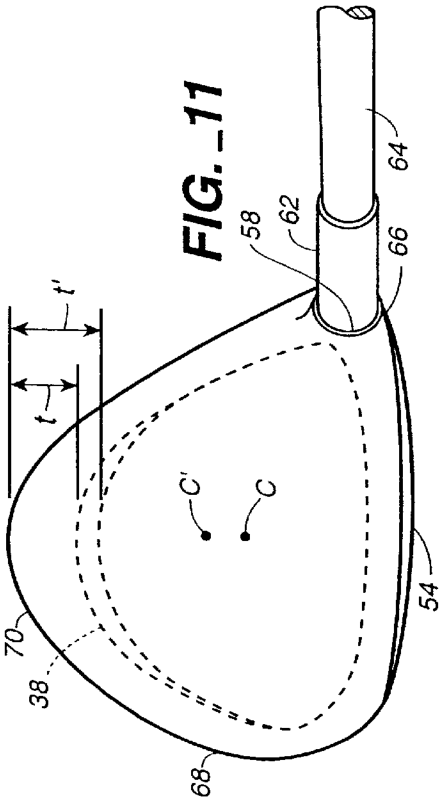
FIG. 11 is a top plan view of the club head illustrating the positioning of the center of gravity.

FIGS. 1–9 of the drawings illustrate steps in a method of making a metalwood club head according to a preferred embodiment of the present invention, while FIGS. 10 and 11 illustrate the finished club head 10. The first step in the process is to forge a solid billet 12 of high strength aluminum alloy such as 6061 T6 aluminum alloy or 7075 T6 aluminum alloy. In one example, 7075 T6 aluminum alloy was used. The billet 12 has an upper face 14 with a short neck 15, a lower face 16 with a recessed area 18, a front end with a rectangular projecting lug 22, and a rear end 24, as illustrated in FIGS. 1 and 3. The billet 12 is first held as illustrated in FIG. 2 between a solid back jaw 26 and movable jaw 28 in order to cut tooling faces 30 onto the holding lug 22 with cutter 32.

FIG. 3 is a front elevational view of the prepared billet 12 after the operation of FIG. 2.

Figure 4:
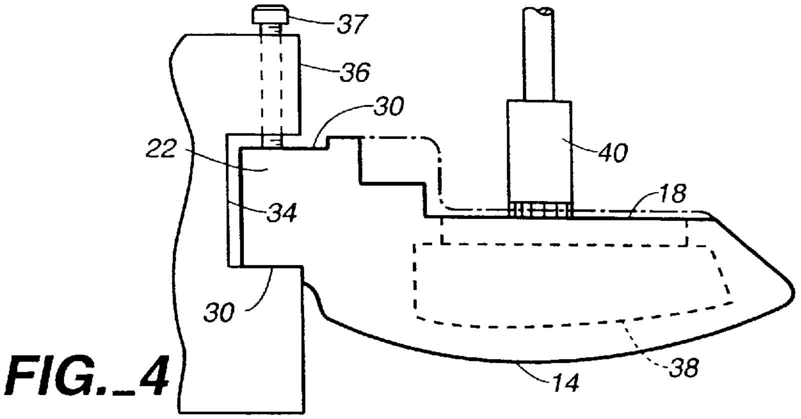
FIG. 4 is a side elevation view showing the machining of the sole plate face and the internal cavity.
Figure 5:
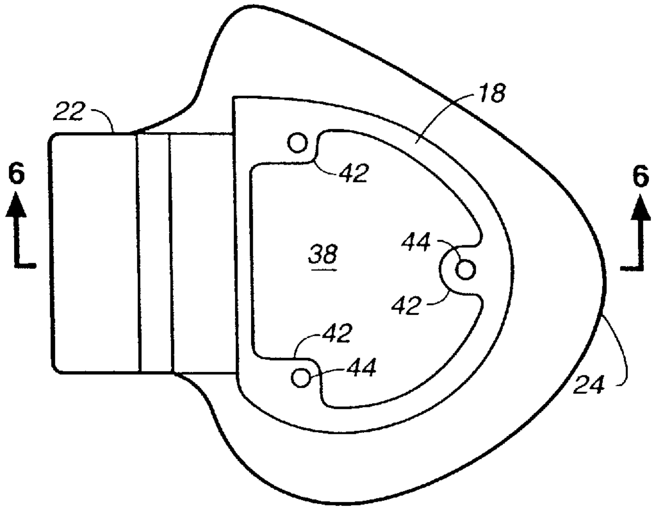
FIG. 5 is a top plan view of the forging as machined in FIG. 4.
Figure 6:
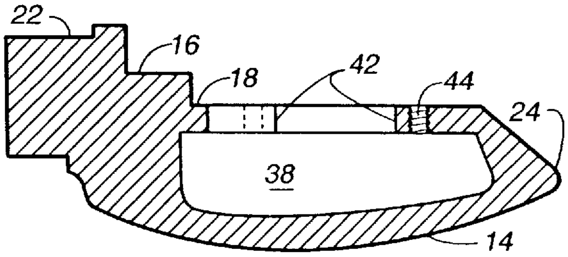
FIG. 6 is a sectional view taken on line 6—6 of FIG. 5.

The forged billet is then machined to precise specifications with a computer controlled milling machine or CNC machine, using various special holding fixtures and cutting tools. Holding lug 22 is used for holding the billet during several of the machining steps. As illustrated in FIG. 4, the lug 22 is secured in a recess 34 in holding fixture 36 in the milling machine via clamping screw 37 while the lower face 16 of the billet is machined to further shape the recessed area 18, and a cavity 38 of predetermined dimensions is cut into the billet, using cutting tool 40. FIGS. 5 and 6 illustrate the cavity 38 and recessed area 18 as machined in the step of FIG. 4. Preferably, ears 42 are formed in the recessed, flat area 18 with a threaded bore 44 cut into each ear 42, as illustrated in FIGS. 5 and 6.

Figure 7:
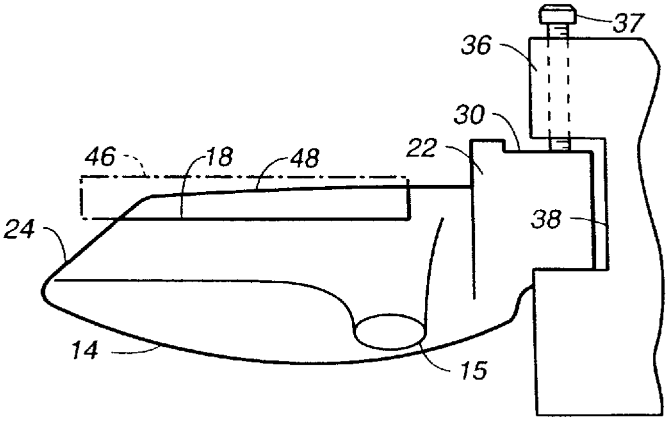
FIG. 7 is a side elevation view showing attachment and shaping of the sole plate.

A flat, rectangular plate 46 as illustrated in dotted outline in FIG. 7 is then secured in the machined recess 18 via screws extending into screw holes 44. The billet and secured plate 46 are then machined together in the position illustrated in FIG. 7 to cut the edges of plate 46 to match the side and rear walls of the billet, and to cut the outer face of plate 46 down to the shape illustrated in solid outline in FIG. 7, forming finished sole plate 48. By machining the sole plate together with the club head, a perfect match is ensured with the club faces transitioning smoothly from billet to sole plate. Thus, the sole plate is milled totally as an integral part of the body of the club head. Although the sole plate is secured with screws in the illustrated embodiment, it will be understood that it may alternatively be secured by bonding, shrink fit, welding or equivalent techniques.

The sole plate may be of the same aluminum alloy as the remainder of the club head or may be of a different material, for example brass, which is more abrasion resistant than aluminum, for clubs where contact with gravel and rocks is likely to occur, such as 2, 3, 4, 5, 6, 7 and 9 woods. Although in the illustrated embodiment the sole plate terminates at a position spaced rearwardly of the front or striking face of the club head, it may in alternative embodiments extend up to the front side of the club. Where a brass sole plate is used, this will give the striking face more durability and also provide an attractive appearance to the front face of the club.

Figure 8:
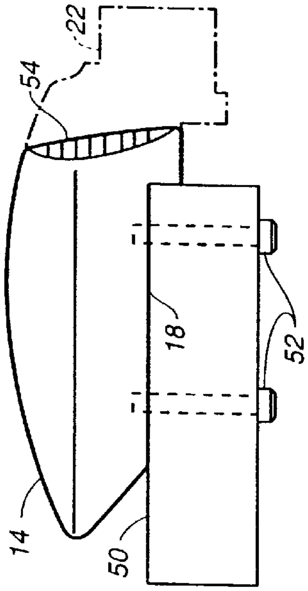
FIG. 8 illustrates the removal of the base and shaping of the club head face.

In the next step of the process, the sole plate is removed and the partially machined head is secured to a fixture 50 in place of sole plate 48 via screw fasteners 52, as illustrated in FIG. 8. The projecting lug 22 is then machined off and the front face is milled to provide the desired, precise bulge and roll characteristics, producing finished striking face 54. This manufacturing process allows all types of striking face configurations, including symmetrical and non-symmetrical bulge and roll. Instead of a constant radius in both the bulge (heel to toe) and roll (top to sole) directions, which is, conventional, the face may be machined to have elliptical bulge and roll, i.e. not a true radius. The face may be machined flat across a central region, with radiused edges. This may produce improved playing characteristics.

Figure 9:
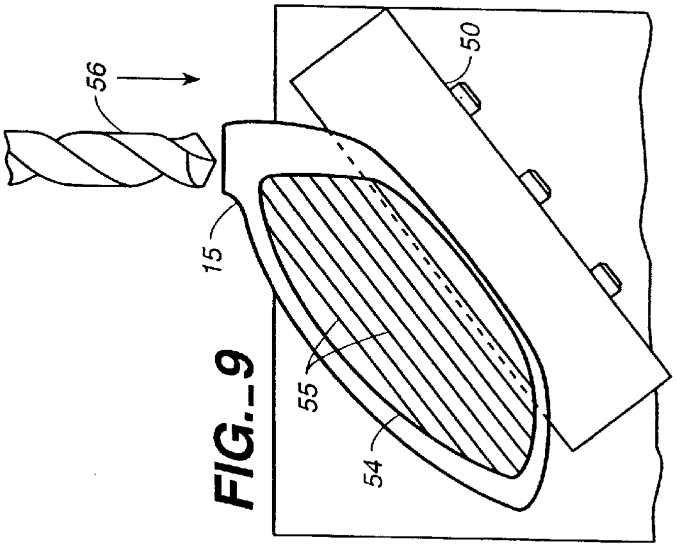
FIG. 9 illustrates the drilling of the hosel socket.

After machining the striking face 54, including any desired grooving 55, the head is held in the same fixture 50 at a desired orientation while drill 56 is used to drill a bore for receiving a hosel tube, as illustrated in FIG. 9. The bore is drilled to produce a desired lie angle and face angle and progression in the finished club head 10. FIG. 10 illustrates a bore 58 drilled out at one possible orientation for receiving hosel tube 62. The bore can therefore be perfectly machined and aligned in the computer milling process to produce upright, flat, open or closed face angle and any desired lie angle. Preferably, the bore 58 terminates in the solid material at the heel end of the club head, but it may alternatively be drilled through the sole plate.

The hosel tube or tube neck 62 is preferably also of aluminum alloy, and may be of the same material as the remainder of the club head. The tube neck 62 is made separately to precise inner and outer diameters. Hosel or tube neck 62 may be extruded, drawn or forged. The hosel or tube neck 62 is then inserted into bore 58 up to the end of the bore and suitably welded or bonded in place, as illustrated in FIG. 10. The golf club shaft 64 is in turn inserted into the hosel 62 and bonded in place. Shaft 64 may be of any conventional golf club shaft material such as steel, graphite, graphite boron or other composite materials, and the like.

The use of an aluminum tube "drop-in" neck for receiving the end of the shaft reduces weight in the hosel region, both due to the drop-in design and also due to the lighter weight material (⅓ the weight of stainless steel). This extra weight can be distributed about the body of the club head for enhanced performance. Thus, the effective weight in the body of the club head can be increased, increasing momentum on impact and potentially increasing ball flight distance. Another benefit from the aluminum hosel over conventional stainless steel hosels is that it will be softer and more flexible. It will therefore reduce the risk of breakage of the relatively brittle but popular graphite shafts. With steel club heads, graphite or composite shafts are subject to breakage at the junction of the shaft and the top of the hosel. Since the modulus of elasticity of aluminum is one third that of stainless steel, it is much more flexible than a stainless steel shaft of equal dimensions. It will therefore reduce the intensity of stresses which the neck of the shaft might otherwise experience on impact.

Although the method has been described above for machining a single club head on a computer controlled milling machine, a number of heads may be machined simultaneously. The solid billets may be mounted on a suitable pallet and advanced to a cutting station, where all heads will be cut according to program instructions in the computer. A shuttle system may be used to advance successive pallets to the cutting station.

Although the method described above involves milling out at cavity through the lower wall of the body, the cavity may alternatively be milled out in other directions, such as through the upper wall, rear wall, front face or end wall of the body.

This method provides a much faster, and more accurate technique for manufacturing golf club heads. Instead of a lengthy and expensive casting and welding procedure, requiring different dies for each different dimension head, the same basic fixtures and cutter blades are used to manufacture a wide range of different club heads according to the same basic method. The internal cavity is simply milled out to different dimensions for different types of club and the hosel bore and face are machined for loft and lie. The use of aluminum alloy or equivalent lightweight materials allows much greater adjustment of the weight. distribution in the club head and precise control of the center of gravity and other characteristics of the club.

The club head 10 may be designed for improved feel and playing characteristics. As mentioned above, head 10 is preferably made entirely or almost entirely of forged aluminum alloy material. One preferred alloy is 7075 T6 aluminum alloy.

This alloy has a yield strength of approximately 67,000 psi and an ultimate strength of 76,000 psi in the wrought form. The T6 designation means that the aluminum material is solution-heat-treated and then artificially aged at an elevated temperature. The weight of 7075 T6 aluminum is 0.101 lbs per cubic inch, which is much less than the weight of stainless steel frequently used in conventional metalwoods, which is 0.290 lbs per cubic inch.

Because of the lower weight of the material used in this club head, the head walls can be made thicker than in conventional stainless steel heads and there is more scope for distributing weight differently about the club head in order to control such characteristics as position of the center of gravity. Preferably, the front or striking face 54 of the finished club head has a thickness of at least 0.2 inches (as compared to 0.12 inches for stainless steel clubs), while the thickness at the heel 66 and toe 68 and the rear wall 70 is preferably in the range from 0.09 to 0.125 inches (as compared to around 0.030 inches for the equivalent walls on a stainless steel club). The thick wall club head made from forged, rather than cast, material, will have much improved performance over conventional stainless steel heads.

The forging process produces alignment of the molecular structure and thus produces a much stronger end result than casting. Thus, even though aluminum alloy is inherently a lighter and softer material than stainless steel, its strength is increased significantly by the forging process. The light weight of the material allows the head walls to be made much thicker than in conventional clubs. The forged aluminum alloy club will therefore be much stronger than a conventional stainless steel club when each experiences the bending forces resulting from impact with a golf ball.

From the standpoint of performance, the thick wall club head is also superior to the stainless steel club head. The average force exerted on the club face of a driver club head, travelling at 110 miles per hour, during impact with the ball, is 1467 pounds, assuming that the ball and club head are in contact for around 0.0005 seconds at the center of the driver. The peak force exerted during contact will be around 2000 pounds. With the thinner stainless steel club face, there is bound to be more deflection when this large force is exerted on it than in the thicker aluminum club face. The reduced club face deflection with this club will yield more consistent performance. It will also have an effect on distance since the energy loss usually associated with deflection and recovery is minimized.

A casting is much more brittle than a forging, and often has defects such as air holes, sinks and other imperfections which do not occur in forging. The problems associated with cast stainless steel club heads with heavy use, such as cracking or permanent deformation, are significantly reduced or avoided with this club. When casting the thin shells of stainless steel heads, a large percentage of rejections, perhaps as much as 30%, result due to porosity. This considerably adds to the manufacturing expense. The present method eliminates this type of rejection.

The forged aluminum alloy club head will also have improved performance over a stainless steel club head. As mentioned above, because of the light weight material used in this club head, the entire weight is not needed in order to maintain structural integrity, and the extra weight not needed for structural integrity can be distributed to provide heel, toe and back weighting to the head as desired. Heel and toe weighting will provide a larger so-called "sweet spot" and a more forgiving club for the less experienced player. Rear weighting will have the effect of moving the center of gravity back from the front face, producing an enhanced "gear effect". Thus, as illustrated in FIG. 11, the center of gravity c is located at a first position rearwardly from the front face with a wall thickness t at the rear of the head, and is moved to new position c' when the wall thickness is increased to t'. This cannot be achieved in large investment cast club heads, since the wall thicknesses around the club are at the minimum necessary for structural integrity while not exceeding the maximum club head weight. Therefore, no extra weight can be provided at the rear of the club head and the center of gravity is normally at the front of the club, and there is little or no gear effect from such clubs. Consequently, a ball struck away from the center, such as at the toe, will fly to the right.

The offset of the center of gravity from the shaft produces a gear effect on impact with the ball if it is not struck exactly at the center. The gear effect will increase the trajectory of the ball's flight, allowing the player to "work" the ball. Thus, the player has more control of the ball with increased gear effect, and professional players typically like to have a club with this capability. The gear effect is also of help to the more average golfer, who does not always strike the ball with the center of the club face. This club head can be provided with a center of gravity positioned to produce a gear effect equivalent to that of a persimmon wood, which is preferred by the skilled player. In other words, the center of gravity c may be positioned about halfway between the front and rear face of the club. This has never before been possible with conventional metalwood heads.

This club head does not require the use of foam in the central cavity in order to attenuate the unpleasant sound that is produced when a golf ball makes contact with a stainless steel club head. The thick wall aluminum construction of this club head significantly reduces or eliminates the vibrations which give rise to the unpleasant sound on impact with a stainless steel club. Thus, foam is not needed and the weight saved by leaving the central cavity empty can be distributed strategically for performance improvement. The golfer will have the sensation of a softer impact with this club head, which improves feel, and the sound on impact is more pleasant.

Although the club head apart from the sole plate is preferably made entirely from a single forged billet of aluminum alloy, as described above, with the sole plate machined separately of the same or different material, a separate fare insert may be used in the front face of the club head. In this case, the face of the club head will be machined precisely to accept the insert.

Any high strength aluminum alloy may be used for the club head. Alternatively, any high density non-metallic material with physical characteristics similar to aluminum, such as certain plastics, may be used in a similar process.

Although a preferred embodiment of the invention has been described above by way of example only, it will be understood by those skilled in the field that modifications may be made to the disclosed embodiment without departing from the scope of the invention, which is defined by the appended claims.

We claim:

1. A method of making a golf club head having a center of gravity, comprising the steps of:

providing a solid billet of material; and, milling out a cavity in the billet, the cavity having dimensions selected to control the center of gravity.

2. The method as claimed in claim 1, the billet having a front end, the method further including the step of milling the front end of the billet to provide a striking face having a desired bulge and roll.

3. The method as claimed in claim 1, the billet further having a lower face, and wherein the cavity is formed in the lower face, and the method further including the steps of:

providing a sole plate at the lower face across the cavity; and milling the sole plate together with the billet so that a smooth transition from the billet to the sole plate is obtained.

4. The method as claimed in claim 3, including the steps of forming a sole plate receiving recess in the lower face of the billet.

5. The method as claimed in claim 4, including the step of holding the billet via the sole plate receiving recess while machining the billet to provide a striking face.

6. The method as claimed in claim 5, including the step of securing the sole plate in the sole plate receiving recess after providing the striking face.

7. The method as claimed in claim 1, wherein the billet is of forged metal.

8. The method as claimed in claim 7, wherein the billet is of forged aluminum material.

9. The method as claimed in claim 1, the method further including the step of forming a holding lug in the billet, and the step of milling the cavity comprises holding the billet by the holding lug while machining the cavity.

10. The method as claimed in claim 1, including the step of forming a bore in the billet for receiving a shaft and oriented to produce a desired lie angle and striking face angle.

11. The method as claimed in claim 10, including the step of securing the shaft in the bore.

12. The method as claimed in claim 11, including the step of securing a hosel tube in the bore and wherein the step of securing the shaft in the bore includes securing the shaft to the hosel tube.

13. A method of making a golf club having a center of gravity, comprising the steps of:

forming a golf club head;

forming a cavity in the golf club head, the cavity having dimensions selected to control the center of gravity;

forming a bore in the golf club head;

securing a hosel tube in the bore; and securing a shaft to the hosel tube.

14. The method as recited in claim 13, wherein the step of securing the shaft to the hosel includes inserting the shaft into the hosel tube.

15. The method as recited in claim 14, wherein the hosel is formed from aluminum alloy.

16. The method as recited in claim 13, wherein the step of forming the golf club head includes:

proving a billet of forged material;

holding the billet; and machining the billet.

17. The method as recited in claim 16, wherein the step of forming the cavity comprises cutting the billet with a cutting tool.

18. The method as recited in claim 13, wherein the dimensions of the cavity are selected to optimize a gear effect of the golf club.

19. The method as recited in claim 13, wherein the dimensions of the cavity are selected such that the center of gravity is moved toward the bore.

* * * * *